United States Patent
Worner

[11] 3,795,293
[45] Mar. 5, 1974

[54] BLOCKING-SYNCHRONIZATION FOR CHANGE-SPEED GEARS OF MOTOR VEHICLES

[75] Inventor: Gunter Worner, Rommelshausen, Germany

[73] Assignee: Daimler-Benz Aktiengesellschaft, Stuttgart-Unterturkheim, Germany

[22] Filed: Dec. 15, 1971

[21] Appl. No.: 208,376

[30] Foreign Application Priority Data
Dec. 15, 1970 Germany............................ 2061620

[52] U.S. Cl.............................................. 192/53 F
[51] Int. Cl............................................ F16d 23/06
[58] Field of Search.................................. 192/53 F

[56] References Cited
UNITED STATES PATENTS
3,175,412    3/1965    Peras............................ 192/53 F X
3,035,674    5/1962    Peras................................ 192/53 F

*Primary Examiner*—Allan D. Herrmann
*Attorney, Agent, or Firm*—Craig and Antonelli

[57]    ABSTRACT

A blocking synchronization for motor vehicle change-speed transmissions in which an axially displaceable shifting sleeve cooperates with synchronizing rings also axially displaceable and rotatable within limits; the synchronizing rings, in turn, cooperate by means of blocking surfaces with the engaging tooth system at the gear whereby the synchronizing rings are centered as well as limited in their axial movability with respect to the shifting sleeve at the gear part carrying the same.

17 Claims, 5 Drawing Figures

BLOCKING-SYNCHRONIZATION FOR CHANGE-SPEED GEARS OF MOTOR VEHICLES

The present invention relates to a blocking synchronization for motor vehicle change-speed transmissions, in which an axially displaceable shifting sleeve cooperates with synchronizing rings also axially displaceable and rotatable within limits, which in their turn cooperate by means of blocking surfaces with the engaging tooth system at the gear.

With known synchronizations of the aforementiond type, the centering and alignment of the synchronizing rings frequently offer difficulties. Consequently, the present invention is concerned with the task to eliminate these difficulties and to propose an unequivocal alignment of the synchronizing rings in every direction.

As solution to the underlying problems, the present invention is predicated on the general concept to align the synchronizing ring exclusively at the supporting part and proposes in particular for that purpose that the synchronizing rings are centered at the gear part carrying the same as well as are also limited at this gear part in their axial moveability with respect to the shifting sleeve.

The proposal according to the present invention entails the advantage that the synchronizing rings are now aligned exclusively according to the respective gear parts and this has as a consequence that the unavoidable axial plays in the assembly of the transmission parts on the shaft can no longer have any effect on the guidance, mounting and operation of the synchronizing rings. The manufacture and assembly of the over-alll transmission therefore becomes more simple because the alignment of the synchronizing rings can be established more easily and fewer small tolerances now have to be taken into consideration for the axial fixing of the transmission parts on their shaft.

A further proposal of the present invention is to the effect that the synchronizing rings are centered on the tooth tips of the engaging tooth system. This results in a very simple manufacture.

Blocking synchronizations are known in the art in which one ring spring is coordinated to each synchronizing ring, which cooperates with a cone surface at the gear body for producing a force at the synchronizing ring directed toward the shifting sleeve. In connection therewith, it is proposed according to the present invention that a radial collar is arranged at the edge of the cone surface facing the shifting sleeve as abutment for the ring spring guided in the synchronizing ring.

Accordingly, it is an object of the present invention to provide a blocking synchronization for motor vehicle change-speed transmissions which avoids by simple means the aforementioned shortcomings and drawbacks encountered in the prior art.

Another object of the present invention resides in a blocking synchronizing mechanism for change-speed gears of the type described above in which both centering and alignment of the synchronizing rings is greatly facilitated and improved.

A further object of the present invention resides in a blocking synchronization for motor vehicle change-speed transmissions in which the synchronizing rings are unequivocally aligned in every direction.

A still further object of the present invention resides in a blocking synchronization for change-speed transmissions in which the synchronizing rings are now aligned exclusively in accordance with the respective gear parts on which they are mounted to minimize axial plays in the assembly of the transmission parts.

Another object of the present invention resides in a blocking synchronization for motor vehicle change-speed transmissions in which any axial plays that may occur during assembly of the transmission parts on the shaft, no longer have any effect on the guidance, mounting and operation of the synchronizing rings.

Still another object of the present invention resides in a synchronization of the type described above which can be manufactured and assembled more easily and which minimizes the number of small tolerances to be considered.

These and other objects, features, and advantages of the present invention will become more apparent from the following description when taken in connection with the accompanying drawing which shows, for purposes of illustration only, one embodiment in accordance with the present invention, and wherein.

Figure 1:
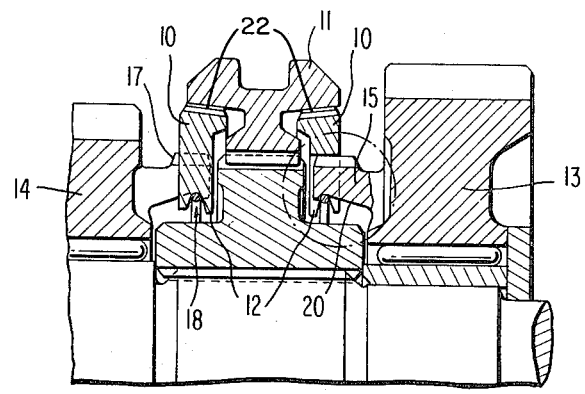
FIG. 1 is a partial longitudinal cross-sectional view through a blocking synchronization in accordance with the present invention for a change-speed gear of a motor vehicle.
Figure 1A:
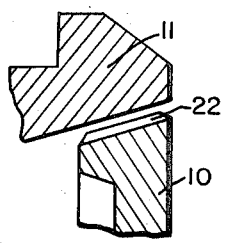
FIG. 1a is an enlarged view of a portion of FIG. 1 which shows the conical surfaces of the shifting sleeve spaced from the conical surfaces of the synchronizing ring.
Figure 3:
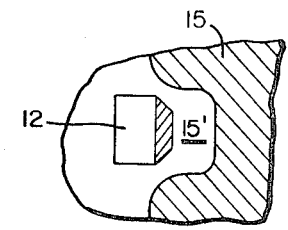
FIG. 3 is a detailed schematic cross-sectional view, taken in the radial direction, showing interengageable blocking surface means at the gear and synchronizing ring.
Figure 2:
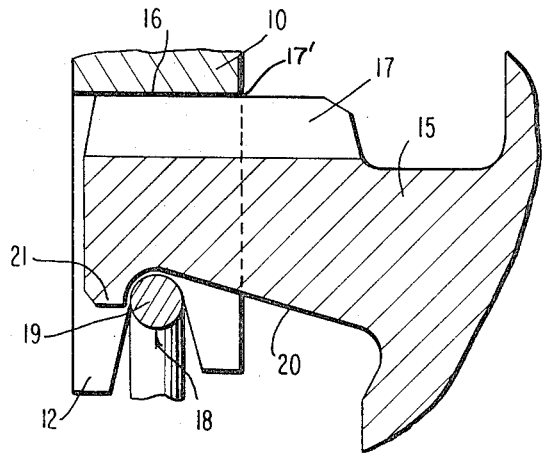
FIG. 2 is a partial cross-sectional view, on an enlarged scale, illustrating the details of FIG. 1 encircled by the dash and dot line circle.

Referring now to the drawing wherein like reference numerals are used throughout the views to designate like parts, and more particularly to FIGS. 1 and 2, the synchronizing rings 10 which cooperate in a conventional manner with a shifting sleeve 11, are provided with inwardly projecting extensions 12 which are distributed uniformly over the circumference and extend through corresponding apertures 15' of a gear rim 15 arranged at a gear 13 or 14. An aperture and extension is schematically illustrated in FIG. 3. These apertures and extensions constitute interengageable blocking surface means which cooperate in a conventional manner. The synchronizing rings 10 are centered—as can be seen in particular from FIG. 2—with the inner surface 16 thereof directly on the tooth tips 17' of the engaging teeth 17 provided at the gear rim 15. The inner surface 16 and the tooth tips form guide surface portions for maintaining the synchronizing ring in a central position. The extensions 12 are provided with a circumferential groove 18 in which is retained a spring ring 19 that cooperates with a cone surface 20 at the gear rim 15 in a conventional manner. The cone surface 20 passes over on its side or edge facing the shifting sleeve 11 into a radially inwardly extending collar or (radial shoulder) 21 which forms an abutment for the ring spring 19 and therewith for the synchronizing ring 10 in the center position of the shifting sleeve 11. In this center position, the synchronizing ring 10 is therefore lifted off with its cone surfaces 22 from the shifting sleeve 11 since it abuts at the collar or shoulder 21 by means of the ring spring 19 (See FIG. 1a for an illustration of lifted off cone surfaces 22).

The synchronizing ring 10 is therefore aligned in this manner exclusively at the gear rim 15, i.e., is therefore aligned at the supporting part.

Figure 4:
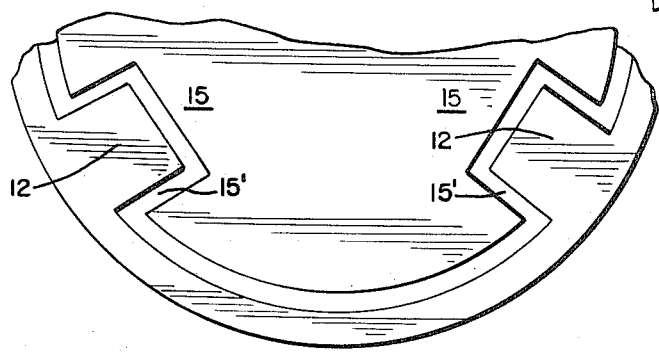
FIG. 4 is a schematic cross-sectional view taken in the axial direction of FIG. 1 which illustrates the positioning of a plurality of gear apertures and associated synchronizing ring extensions.

FIG. 4 schematically illustrates the positioning of a plurality of gear apertures 15' and associated synchronizing ring extensions 12 about the circumference of the installation.

In operation, when sleeve 11 is shifted axially, the synchronizing ring 10 is pushed in the same direction to more securely rotatably block the ring 10 and gear part 15 by way of the blocking surfaces illustrated in FIG. 3. The outer conical surfaces 22 of the ring 11 serve to synchronizingly transmit rotative forces from the sleeve 11 to the gear 13 until the gear 13 is rotating at the same speed as sleeve 11, at which time the teeth 17 interengage with the corresponding teeth at the sleeve 11. See U.S. Pat. No. 3,635,674 to Peras for a similarly operating device which differs from the present invention in that the synchronizing ring is not guided and centered at the gear wheel part, but rather at the centrally disposed hub portion with the consequent disadvantages described in the introduction of the present specification.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intended to cover all such changes and modifications as are encompassed by the scope of the appended claims.

What I claim is:

1. A blocking synchronization for use with motor vehicle change-speed gears and the like comprising:
    a gear wheel rotatable about a gear wheel axis,
    engaging teeth means on said gear wheel,
    a shifting sleeve axially displaceable along said axis between positions in and out of driving engagement with said engaging teeth means, synchronizing ring means interposed between said gear wheel and shifting sleeve, said synchronizing ring means being engageable with said shifting sleeve for displacement along said axis in response to axial displacement of said shifting sleeve, said synchronizing ring means including blocking surface means engageable with corresponding blocking surface means on said engaging teeth means of said gear wheel to transmit rotational forces between said synchronizing ring means and said gear wheel,
    and interengaging guide surface portions at said gear wheel and said synchronizing ring means for maintaining said synchronizing ring means in a central position with respect to said axis during axial movement of said synchronizing ring means, said guide surface portion being separate from said blocking surface means.

2. A blocking synchronization according to claim 1, characterized in that the synchronizing ring means is maintained in said central position exclusively by the respective interengaging guide surface means at said gear wheel and said synchronizing means.

3. A blocking synchronization according to claim 1, further comprising a ring spring guided in said synchronizing ring means and engaging with a cone surface at said gear wheel for producing a force at the synchronizing ring means directed toward the shifting sleeve, characterized in that at the edge of the cone surface facing the shifting sleeve, a radial shoulder is provided in said gear wheel as an abutment for the ring spring guided in the synchronizing ring means.

4. A blocking synchronization according to claim 3, wherein said blocking surface means of said synchronizing ring means includes circumferentially distributed inwardly projected extensions, and wherein said blocking surface means of said engaging teeth means of said gear wheel include apertures in said gear wheel having side wall portions engageable with said extensions.

5. A blocking synchronization according to claim 4, wherein tooth tips of said engaging teeth means form the guide surface portion of said gear wheel.

6. A blocking synchronization according to claim 4, characterized in that the synchronizing ring means is maintained in said central position exclusively by the respective interengaging guide surface means at said gear wheel and said synchronizing means.

7. A blocking synchronization according to claim 4, wherein the guide surface portion of said gear wheel is on a gear rim containing the teeth of said engaging teeth means.

8. A blocking synchronization accoring to claim 1, wherein tooth tips of said engaging teeth means form the guide surface portion of said gear wheel.

9. A blocking synchronization according to claim 1, wherein said blocking surface means of said synchronizing ring means includes circumferentially distributed inwardly projected extensions, and wherein said blocking surface means of said engaging teeth means of said gear wheel include apertures in said gear wheel having side wall portions engageable with said extensions.

10. A blocking synchronization according to claim 9, wherein tooth tips of said engaging teeth means form the guide surface portion of said gear wheel.

11. A blocking synchronization according to claim 9, characterized in that the synchronizing ring means is maintained in said central position exclusively by the respective interengaging guide surface means at said gear wheel and said synchronizing means.

12. A blocking synchronization according to claim 9, wherein the guide surface portion of said gear wheel is on a gear rim containing the teeth of said engaging teeth means.

13. A blocking synchronization according to claim 1, wherein the guide surface portion of said gear wheel is on a gear rim containing the teeth of said engaging teeth means.

14. A blocking synchronization according to claim 1, wherein a second gear wheel and synchronizing ring means are symmetrically arranged with respect to said first-mentioned gear wheel and ring means at the opposite axial side of said shifting sleeve, said second synchronizing ring means being maintained in a central position with respect to said axis during axial movements thereof by respective interengaging guide surface portions of said second gear wheel and said second synchronizing ring means.

15. A blocking synchronization according to claim 14, wherein tooth tips of respective ones of said engaging teeth means form the respective guide surface portions for said respective gear wheels.

16. A blocking synchronization according to claim 14, further comprising a ring spring guided in each of said synchronizing ring means and engaging respectively with a cone surface provided at a respective gear wheel for producing a force at the respective synchronizing ring means directed toward the shifting sleeve, characterized in that at the edge of the cone surface facing the shifting sleeve, a radial shoulder is provided in each of said gear wheels as an abutment for the respective ring spring guided in the respective synchronizing ring means.

17. A blocking synchronization according to claim 1, wherein said guide surface portions extend parallel to said axis with said guide surface portion of said gear wheel and said guide surface portion of said synchronizing ring means facing one another in respective opposite radial directions.

* * * * *